US010255807B1

(12) United States Patent
Stenneth

(10) Patent No.: US 10,255,807 B1
(45) Date of Patent: Apr. 9, 2019

(54) METHOD AND APPARATUS FOR PROVIDING A MAP DATA UPDATE BASED ON REGION-SPECIFIC DATA TURBULENCE

(71) Applicant: HERE GLOBAL B.V., Eindhoven (NL)

(72) Inventor: Leon Stenneth, Chicago, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 15/719,122

(22) Filed: Sep. 28, 2017

(51) Int. Cl.
G08G 1/14 (2006.01)
G06F 17/30 (2006.01)

(52) U.S. Cl.
CPC ....... G08G 1/141 (2013.01); G06F 17/30241 (2013.01)

(58) Field of Classification Search
CPC ..... G08G 1/141; G06F 17/00; G06K 9/00771
USPC .......................................................... 701/450
See application file for complete search history.

(56) References Cited

U.S. PATENT DOCUMENTS 7,949,464 B2 5/2011 Kaplan et al.
9,558,664 B1 1/2017 Gaebler et al.
2014/0309924 A1 10/2014 Varoglu et al.
2015/0088790 A1* 3/2015 Chidlovskii ....... G06Q 30/0202 706/12
2016/0189546 A1 6/2016 Kami et al.
2016/0196747 A1* 7/2016 Tsyrklevich ........... G08G 1/143 701/532
2017/0124874 A1* 5/2017 Cai ..................... G06K 9/00771
2018/0052860 A1* 2/2018 Hayes .................. H04W 4/029
2018/0174454 A1* 6/2018 Tiwaree ................ G08G 1/148

FOREIGN PATENT DOCUMENTS

JP 2000105897 A 4/2000
WO 2015011708 A1 1/2015
WO 2016071512 A1 5/2016

* cited by examiner

Primary Examiner — Tan Q Nguyen
(74) Attorney, Agent, or Firm — Ditthavong & Steiner, P.C.

(57) ABSTRACT

An approach is provided for map data updates based on region-specific data turbulence. The approach involves, for example, retrieving historical map data for the map region and segmenting the historical map data into a time series including at least a first time epoch and a second time epoch. The approach also involves calculating a first representative value for the first time epoch based on the historical map data segmented into the first time epoch, and a second representative value for the second time epoch based on the historical map data segmented into the second time epoch. The approach further involves calculating the map data turbulence based on the first representative value and the second representative value.

22 Claims, 14 Drawing Sheets

501

521

METHOD AND APPARATUS FOR PROVIDING A MAP DATA UPDATE BASED ON REGION-SPECIFIC DATA TURBULENCE

BACKGROUND

Providing real-time or up-to-date map data (e.g., parking availability information, traffic information, etc.) is an area of interest for many mapping/navigation service providers and original equipment manufacturers (OEMs). For example, service providers and OEMs can create and maintain a geographic database of parking data and/or other similar map data along various road links or street segments. However, because such map data can be variable over time and location, service providers face significant technical challenges to updating the data while also minimizing the computing and bandwidth resources for providing data updates.

SOME EXAMPLE EMBODIMENTS

Therefore, there is a need for an approach for providing map data updates based on region-specific data turbulence.

According to one embodiment, a method for measuring a map data turbulence (e.g., a parking data turbulence) for a map region comprises retrieving historical map data (e.g., historical parking data) for the map region. The method also comprises segmenting the historical map data into a time series including at least a first time epoch and a second time epoch. The method further comprises calculating a first representative value (e.g., a first parking availability metric) for the first time epoch based on the historical map data segmented into the first time epoch, and a second representative value (e.g., a second parking availability metric) for the second time epoch based on the historical map data segmented into the second time epoch. The method further comprises calculating the map data turbulence based on the first representative value and the second representative value. In one embodiment, the method further comprises calculating a map data update frequency (e.g., a parking data update frequency) based on the map data turbulence, and initiating a computation or a transmission of a map data update (e.g., a parking data update) based on the map data update frequency.

According to another embodiment, an apparatus for measuring a map data turbulence for a map region comprises at least one processor, and at least one memory including computer program code for one or more computer programs, the at least one memory and the computer program code configured to, with the at least one processor, cause, at least in part, the apparatus to retrieve historical map data for the map region. The apparatus also is caused to segment the historical map data into a time series including at least a first time epoch and a second time epoch. The apparatus is further caused to calculate a first representative value for the first time epoch based on the historical map data segmented into the first time epoch, and a second representative value for the second time epoch based on the historical map data segmented into the second time epoch. The apparatus is further caused to calculate the map data turbulence based on the first representative value and the second representative value. In one embodiment, the apparatus is further caused to calculate a map data update frequency based on the map data turbulence, and to initiate a computation or a transmission of a map data update based on the map data update frequency.

According to another embodiment, a non-transitory computer-readable storage medium for transmitting a parking data update based on a parking data turbulence for a map region carries one or more sequences of one or more instructions which, when executed by one or more processors, cause, at least in part, an apparatus to retrieve historical map data for the map region. The apparatus also is caused to segment the historical map data into a time series including at least a first time epoch and a second time epoch. The apparatus is further caused to calculate a first representative value for the first time epoch based on the historical map data segmented into the first time epoch, and a second representative value for the second time epoch based on the historical map data segmented into the second time epoch. The apparatus is further caused to calculate the map data turbulence based on the first representative value and the second representative value. In one embodiment, the apparatus is further caused to calculate a map data update frequency based on the map data turbulence, and to initiate a computation or a transmission of a map data update based on the map data update frequency.

According to another embodiment, an apparatus comprises means for retrieving historical map data for the map region. The apparatus also comprises means for segmenting the historical map data into a time series including at least a first time epoch and a second time epoch. The apparatus further comprises means for calculating a first representative value for the first time epoch based on the historical map data segmented into the first time epoch, and a second representative value for the second time epoch based on the historical map data segmented into the second time epoch. The apparatus further comprises means for calculating the map data turbulence based on the first representative value and the second representative value.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing map data updates based on data turbulence are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
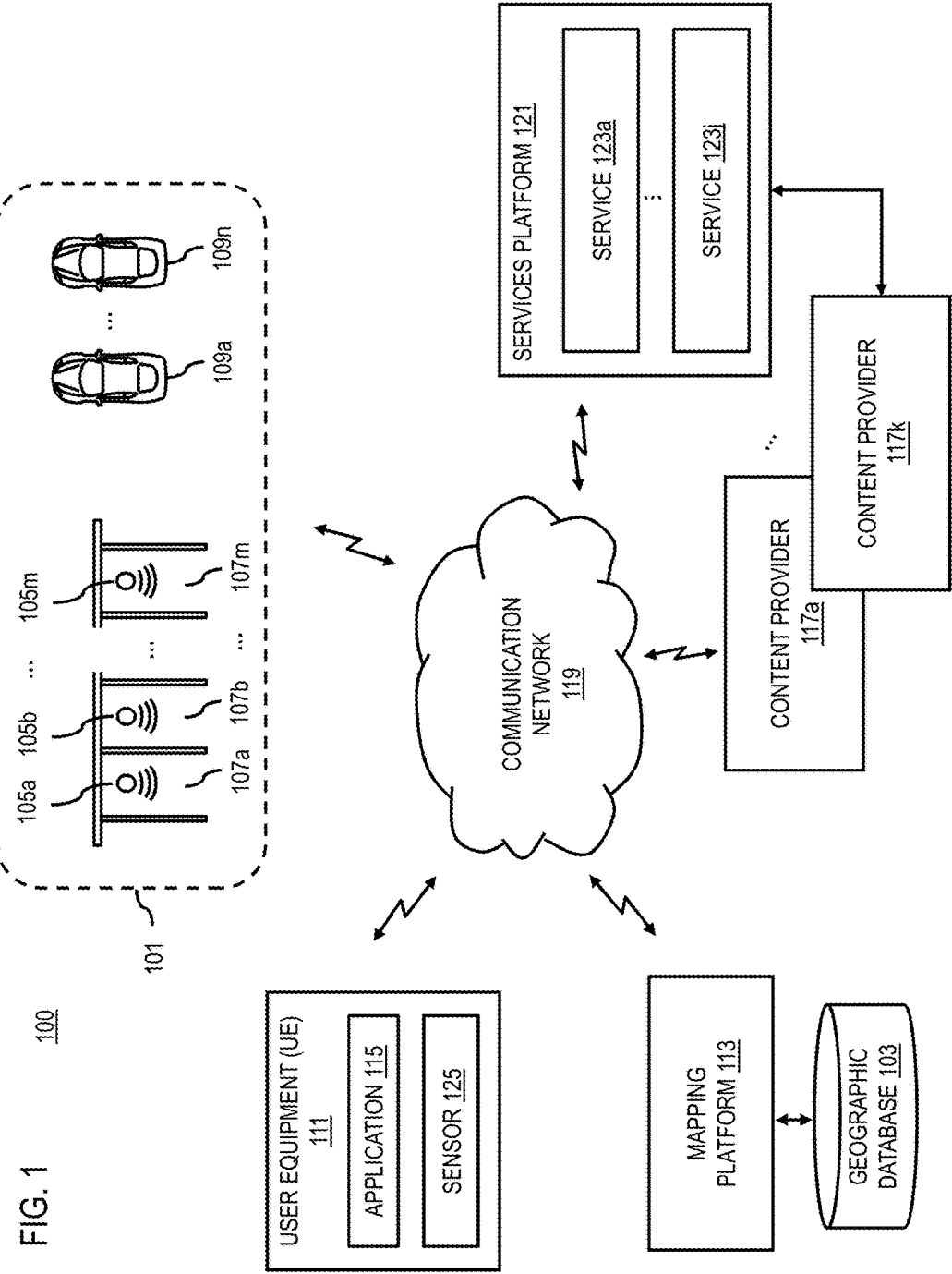
FIG. 1 is a diagram of a system for providing map data updates based on data turbulence, according to one embodiment.

FIG. 1 is a diagram of a system for providing map data updates based on data turbulence, according to one embodiment. As discussed above, providing real-time or up-to-date map data that reflects current conditions in a map region (e.g., road link, map tile, geographic boundary, etc.) is an area of interest for service providers, original equipment manufacturers (OEMs), and/other mapping/navigation-related companies. In many cases, the map data can vary over time and location for a variety of factors. Because of this variability, service providers often must provide periodic data updates to ensure that the map data (e.g., parking availability data) reflects current conditions as much as possible. Traditionally, service providers compute and/or publish map data at the same rate or frequency for all regions represented in a geographic database.

However, because the factors affecting data variability (i.e., data turbulence) can also vary from map region to map region, applying the same data update frequency for all regions can lead to over updating for map regions where the map data does not change much over time. This over updating, in turns, can lead to potentially wasting computing and/or bandwidth resources needed to calculate and transmit data updates when the updates are not needed because the data is not variable or turbulent. Conversely, in map areas where the map data changes often, applying the same update frequency for all map regions can lead to under reporting map data so that currently published data does not reflect current conditions in a map region. This can lead to a poor user experience if the user is relying on the published map data to make navigation or other travel decisions.

For example, with respect to parking availability data along road links or other map regions of a geographic database, parking availability can vary according to many factors such as residential vs commercial streets, weekdays vs weekends, time of day, events, POIs, etc. Accordingly, parking along a road link in a commercial district during business hours can be more variable than along a road link in a rural area during overnight hours. Accordingly, using a common update frequency for both road links can lead to providing out-of-date parking availability data in the commercial district, and to over updating parking availability data in the rural area which leads to potentially wasted computing and bandwidth resources. In this case, increasing the update frequency to address the under-reporting in the commercial district would lead to even greater wasted resources in the rural district, and decreasing the update frequency to conserve resources in the rural district can worsen the under-reporting problem in the commercial district.

To address this problem, a system 100 of FIG. 1 introduces a capability to determine or measure map data turbulence on region-specific basis for map regions of a geographic database. In one embodiment, the system 100 can then calculate a map data update frequency that is specific to each region based on the respective map data turbulence. By way of example, the map data turbulence indicates how dispersed or variable a given map data parameter (e.g., parking availability) is for a given map region over time. For example, returning to the example of parking availability data, in some places or regions, parking availability does not change much and the parking data turbulence is low. Thus, for these regions, the system 100 can calculate an update frequency that is lower for regions with low turbulence. Similarly, in regions where the parking turbulence or other map data turbulence is high, the system 100 can set a higher map data update frequency. In this way, in one embodiment, the system 100 can advantageously reduce computing and/or bandwidth resources by implementing a higher update frequency for a region with higher data turbulence and implementing a lower update frequency for a region with lower data turbulence.

As shown in FIG. 1, the system 100 includes at least one map region 101 that is represented in a geographic database 103. By way of example, the map region 101 can be a road link, map tile, and/or any other geographic boundary (e.g., street block, neighborhood, political boundary, etc.). In one embodiment, the map region 101 includes or has installed map data sensors 105*a*-105*m* (also collectively known as map data sensors 105) for gathering map data within the map region 101. In the example of FIG. 1, the map data sensors 105 are parking sensors (e.g., in-ground parking sensors or equivalent) deployed in respective parking spaces 107*a*-107*m* (also collectively referred to as parking spaces 107) located in the region. Accordingly, in this example, the map data can include parking availability or occupancy data determined by the sensors 105. Parking availability or occupancy information, for instance, refers to data indicating how many parking spaces are occupied (or conversely how many parking spaces are available) in a given map region 101 (e.g., on a given road link or other parking facility (e.g., parking garage, parking lot, etc.) located within the map region 101).

In addition or as an alternate to using the sensors 105 to collect map data, the system 100 can use location trace or probe data collected by vehicles 109*a*-109*n* (also collectively referred to as vehicles 109) to generate map data. In one embodiment, the vehicles 109 and/or one or more user equipment (UE) 111 associated with the vehicle 109 can act as probes traveling in the map region 101. Although the vehicle 109 is depicted as an automobile, it is contemplated that the vehicle 109 can be any type of transportation vehicle manned or unmanned (e.g., motorcycles, buses, trucks, boats, bicycles, etc.) capable traveling within the map region 101 to generate map data, and the UE 111 can be associated with any of the types of vehicles 109 or a person or thing traveling in the map region 101. For example, with respect to parking data, the system 100 can analyze the location trace or probe data (e.g., GPS probe data) collected from the vehicles 109 and UE 111 to derive park-in and park-out events and generate parking data.

Although the various embodiments described herein are discussed with respect to parking data as an example of map data, it is contemplated that the map data can be any data indicating a characteristic of the map region or the links, roads, and/or map features contained therein that is associated with a location within the map region 101 or other map regions of the geographic database 103. For example, the map data can indicate a characteristic of the map region 101 that is variable or can change over time including, but not limited to: parking availability, traffic, map features (e.g., points of interest, roads, buildings, natural features, terrain, etc.) present in the map region 101, weather, and/or the like. In one embodiment, to associate the map data with a location in the map region 101, the map data can be linked to a road link, map tile, and/or any other map data record of the geographic database 103.

Parking data is a used as an example of map data because it is an area of interest for service providers, OEMs, and/or other mapping/navigation-related companies or services. For example, looking for parking (e.g., on-street parking or parking in other types of parking facilities), particularly in urban or congested areas, can be stressful and difficult for drivers. In some cases, a significant amount of traffic congestion in cities (e.g., approximately 30% in some cases) can be caused by drivers circling around their intended destinations to look for available parking spaces. Accordingly, OEMs consider a service to provide parking data to be a key differentiator from their competition. However, because of the highly dynamic nature of parking occupancy or availability, service providers and OEMs face significant technical challenges to efficiently and accurately gathering parking occupancy data. These challenges are addressed by the various embodiments described herein.

Figure 2:
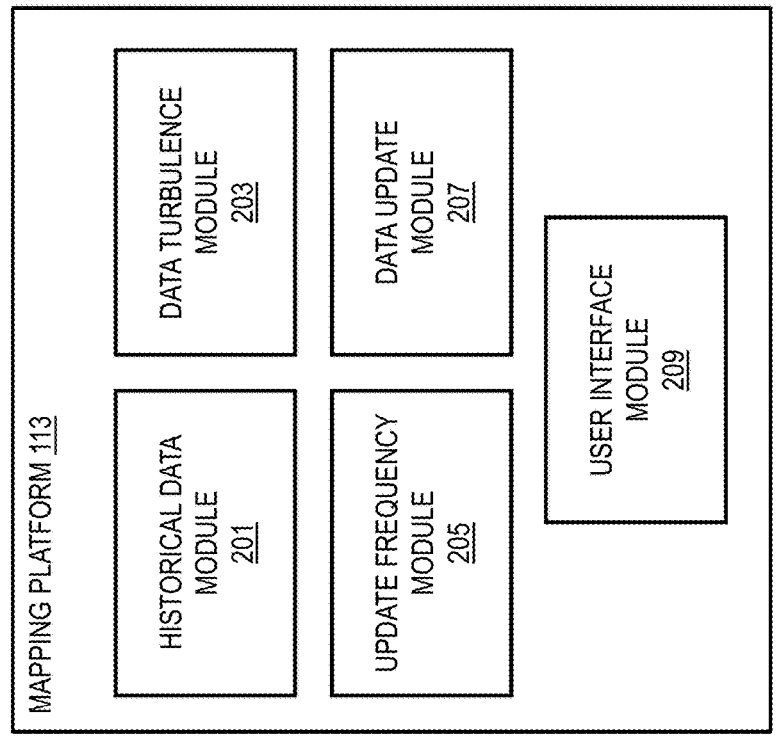
FIG. 2 is a diagram of the components of a mapping platform, according to one embodiment.

In one embodiment, the system 100 includes a mapping platform 113 for performing the process for providing map data updates based on region-specific data turbulence according to the various embodiments described herein. By way of example, as shown FIG. 2, the mapping platform 113 includes one or more components for performing the process according to the various embodiments described herein. It is contemplated that the functions of these components may be combined or performed by other components of equivalent functionality. In one embodiment, the mapping platform 113 includes a historical data module 201, a data turbulence module 203, an update frequency module 205, a data update module 207, and a user interface (UI) module 209. The above presented modules and components of the mapping platform 113 can be implemented in hardware, firmware, software, or a combination thereof. Though depicted as a separate entity in FIG. 1, it is contemplated that the mapping platform 113 may be implemented as a module of any of the components of the system 100 (e.g., a component of the vehicle 109, navigation system of the vehicle 109, UE 111, and/or application 115). In another embodiment, one or more of the modules 201-209 may be implemented as a cloud based service, local service, native application, or combination thereof. The functions of these modules are discussed with respect to FIGS. 3-7 below.

Figure 3:
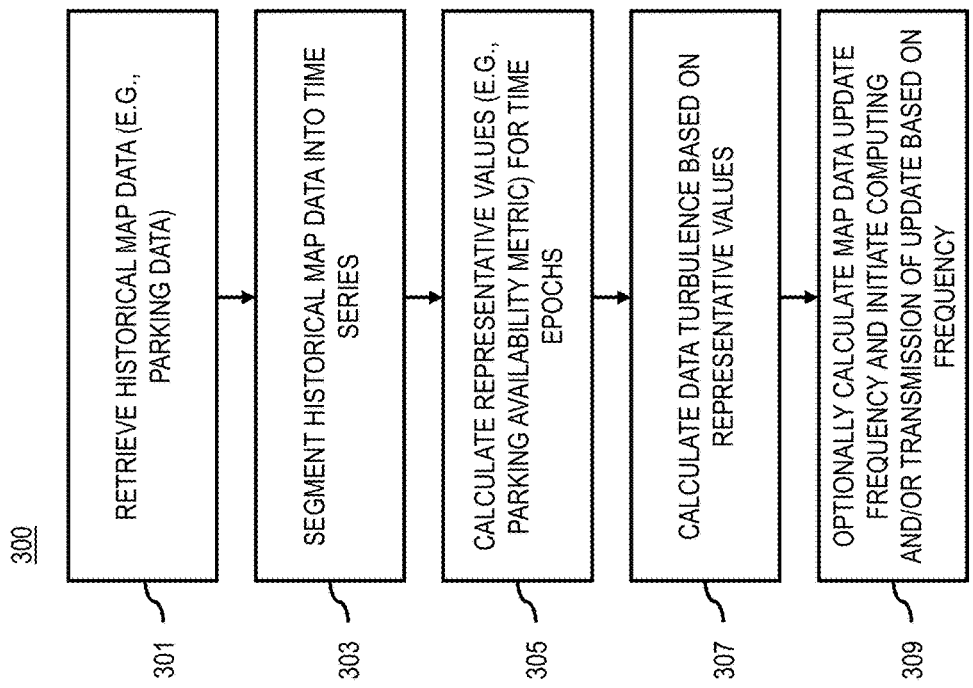
FIG. 3 is a diagram of a process for providing map data updates based on data turbulence, according to one embodiment.
Figure 10:
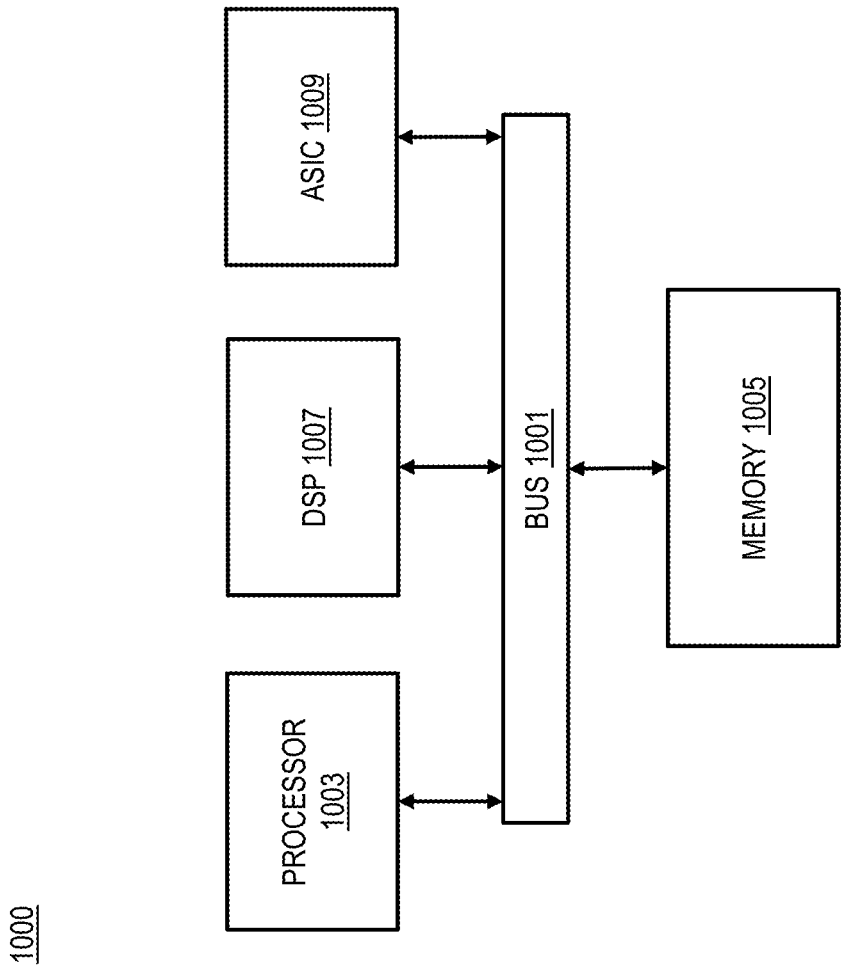
FIG. 10 is a diagram of a chip set that can be used to implement an embodiment.

FIG. 3 is a diagram of a process for providing map data updates based on data turbulence, according to one embodiment. In various embodiments, the mapping platform 113 and/or any of the modules 201-209 of the mapping platform 113 as shown in FIG. 3 may perform one or more portions of the process 300 and may be implemented in, for instance, a chip set including a processor and a memory as shown in FIG. 10. As such, the mapping platform 113 and/or any of the modules 201-209 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 301, the historical data module 201 gathers historical map data (e.g., historical parking availability data) for a given region by, for instance, retrieving historical map data for the map region from one or more sensors, probes, and/or other data sources (e.g., third party data providers such as content providers 117*a*-117*k* as shown in FIG. 1). In one embodiment, the map region is represented as a map link, a map tile, a map data record, or a combination thereof of a geographic database. In other words, the map region can be any geographical feature or area represented in, for instance, the geographic database 103. For example, the map region 101 can also include the geographic area represented by the area footprint of a parking facility (e.g., parking lot, parking garage, etc.), building, or other POI. In one embodiment, as discussed above, the historical map data includes data representing any variable characteristic of the map region. By way of example, the variable characteristic includes, but is not limited to, a parking availability, a traffic condition, a map feature present in the map region (e.g., new or modified roads, POIs, buildings, terrain features, etc.), or a combination thereof.

For example, in an embodiment in which the map data of interest is parking data, the historical data module 201 can retrieve historical parking data collected by parking sensors 105 installed in respective parking spaces 107 within the map region 101 of interest, or collected by probe vehicles 109 traveling and parking within the map region 101. In one embodiment, the historical parking data comprise parking parameters including, but not limited to, a park-in time (e.g., time at which at one of the vehicles 109 park in respective parking spaces 107 in the map region 101) and a park-out time (e.g., time at which the vehicles 109 leave the respective parking spaces). By way of example, a parking space 107 can be considered as unavailable or occupied during period between the park-in time and the park-out time, and available or unoccupied outside this period. In some embodiments, other parking parameters in the parking data can include location of the parking space 107, an identifier (ID) of the parking space 107, type of parking space (e.g., on-street, metered, restricted time, etc.), and/or other contextual parameters (e.g., weather, time, date, weekday/weekend, season, etc.).

In addition or as an alternate to collecting historical map data from sensors 105 (e.g., parking sensors 105), the system 100 can also use parking occupancy data or other map data collected in the map region 101 using any other equivalent means. For example, the historical parking data of the map region 101 can be determined from location trace or probe data collected or reported from vehicles 109 as they park in or leave the parking spaces 107. In other words, the probe data from the vehicles 109 can be used to calculate park-in and park-out parameters. These parameters are analogous to the parking parameters as described above with respect to the parking sensors 105, but generated from probe data. In one embodiment, the system 100 can use only parking sensor 105 based data in place of probe based data if the uncertainty of the probe data is above a threshold value.

In one embodiment, the historical data module 201 optionally suppresses one or more records of the historical parking data based on one or more suppression criteria before determining the data turbulence and/or associated data update frequency. In other words, the historical data module 201 can specify any criteria or thresholds for determining which map data records to suppress or filter from further processing by the mapping platform 113. The criteria, for instance, can be based on determining whether each record of the retrieved map data meet requirements for accuracy, representativeness (e.g., indicated by potential data sampling error), and/or the like. In this way, the historical data module 201 can suppress data collected when the suppression criteria indicate that the collected map data may not accurately represent the true value of the map data parameter in the map region.

For example, in one embodiment, when both sensor-based and probe-based data are available, the historical data module 201 can use only sensor-based map data in place of probe-based data if the uncertainty of the probe data is above a threshold value. In another embodiment, when collecting map data from sensors or probes in the map region, if there are too few reporting sensors or probes, the collected map data may not be accurate or representative and can be suppressed. Accordingly, the one or more suppression criteria can include a threshold number of operational parking sensors or reporting probes (e.g., probe vehicles and/or probe UEs 111) in the map region 101. The historical data module 201 can then suppress or filter one or more records of the historical parking data based on a determination that the observed number of operational parking sensors/reporting probes at the time the one or more records were collected is below the threshold number of operational parking sensors/reporting probes. For example, the historical data module 201 can suppress parking data when the total number of operational sensors on a link or map region of interest is significantly less than the total number of sensors present on the link.

In some embodiments, the suppression criteria can be specific to the type of map data being evaluated. For example, with respect to parking data, the suppression criteria can include the presence of a restricted parking time period for the map region 101 of interest. More specifically, the suppression criteria can be used to determine whether the collection time and location of a parking data record from the map region 101 is within and/or proximate to the restricted parking time period. For instance, if parking is restricted along a road link of the map region 101 for a certain time period to allow for street cleaning, the historical data module 201 can suppress parking availability data that is reported just before, during, and/or after street cleaning that imposes parking restrictions during the cleaning. More generally, the one or more records of the historical parking data are suppressed based on a determination that the one or more records were collected during the restricted parking time period or within a time threshold of a beginning or an ending of the restricted parking time period. In this way, parking variability or turbulence created by the transition between allowed and restricted parking and vice versa can be eliminated from the data turbulence calculation when such variability is not desired to be captured.

In embodiments where suppression or filtering of the historical data is performed, the historical data module 201 will transmit or provide only the historical map data remaining after suppression to subsequent components of the mapping platform 113 for processing.

In step 303, the historical data module 201 organizes the historical map data by time. In one embodiment, the historical data module 201 can segment the map data into a time series including at least a first time epoch and a second time epoch. The time series and/or the collection times of the map data records can then be sorted in ascending or descending order. In one embodiment, the first time epoch and the second time epoch are consecutive time epochs in the time series. In another embodiment, the second time epoch is any time epoch that follows the first time epoch in time.

FIGS. 4A-4D illustrate examples of historical parking data collected from various map regions 101 organized by time showing differences in parking data variability or turbulence between different road links (e.g., different map regions 101). The historical parking data of FIGS. 4A-4D represent parking occupancy (e.g., number of parking spots in a respective road link or street segment that is occupied) versus time. In one embodiment, the parking occupancy pattern can span any period of time. In the examples described herein, the time period is a one-day or 24-hour period. As shown, the historical parking data 401 is arranged in ascending order by time for the 24-hour period. Each data record of the parking data 401 is also depicted as a range or spread to indicate variability. For example, some streets or road links are always fully occupied 24 hours a day by 7 days a week. Other streets have high occupancy during the day time and low occupancy early in the morning and late at night.

Figure 4A:
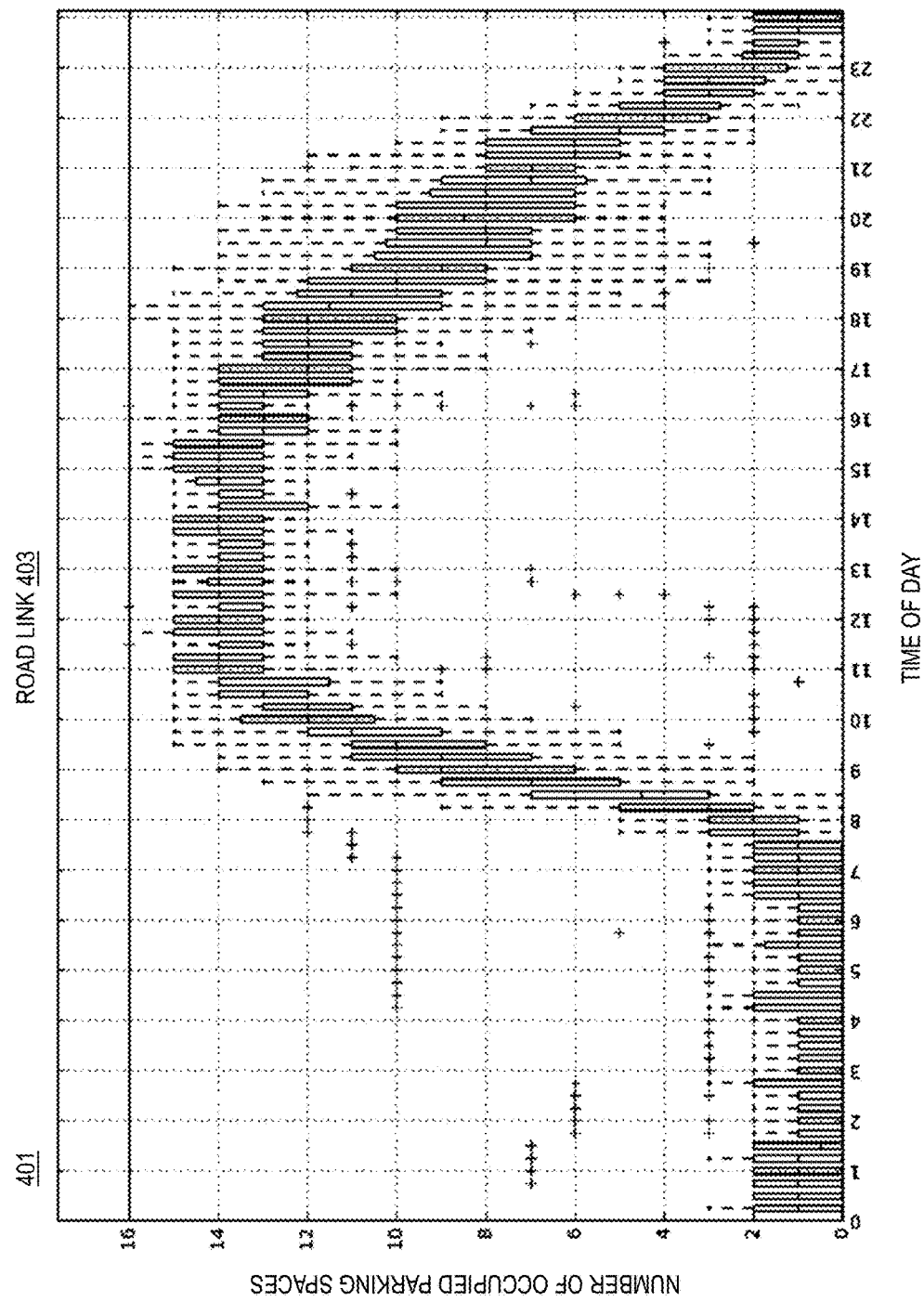
FIGS. 4A-4D are diagrams illustrating historical parking data for example road links or map regions, according to one embodiment.

FIG. 4A illustrates a historical parking data 401 for a road link 403 located in commercial business district (CBD) of a city. In this example, the CBD consists mainly of office buildings that maintain standard office hours (e.g., 9 a.m.-5 p.m.). Accordingly, the historical parking data 401 indicates that parking spaces 107 along the road link 403 are mostly available early in the morning and fill up quickly beginning around 8 a.m. Then the parking occupancy decreases after 5 p.m. This parking occupancy pattern 221 is similar for working weekdays.

Figure 4B:
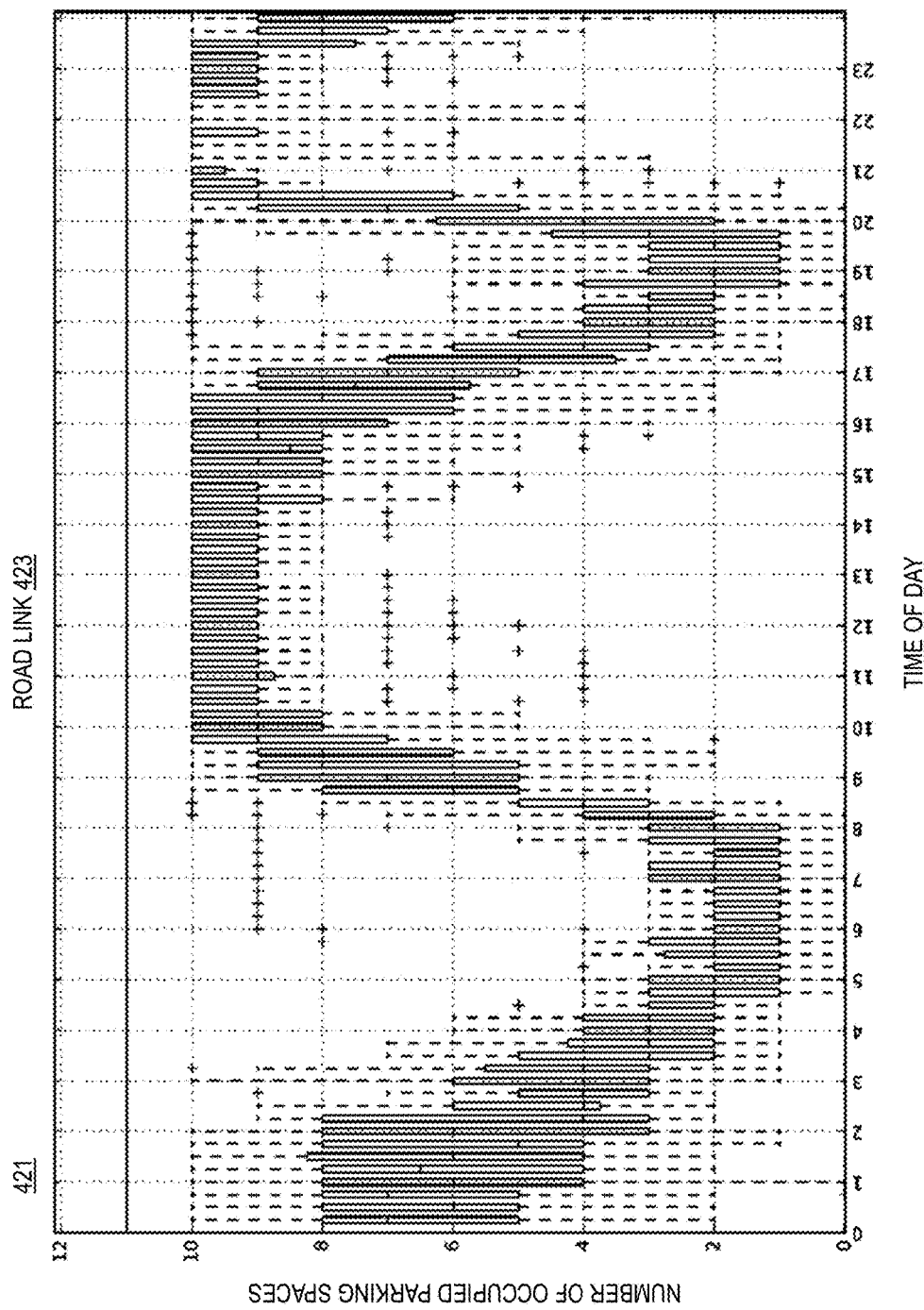

FIG. 4B illustrates a historical parking data 421 for a road link 423 that is also located in the CBD but includes a restaurant point of interest (POI) or other similar POI. When compared to the historical paring data 401 of FIG. 4A (e.g., which is in the CBD but has no restaurant POI), the restaurant or other POI attracts parking demand after standard business hours. As a result, the historical parking data 421 shows increased demand and variability from approximately 8 p.m. to 2 a.m. (the approximate operating hours of the restaurant).

Figure 4C:
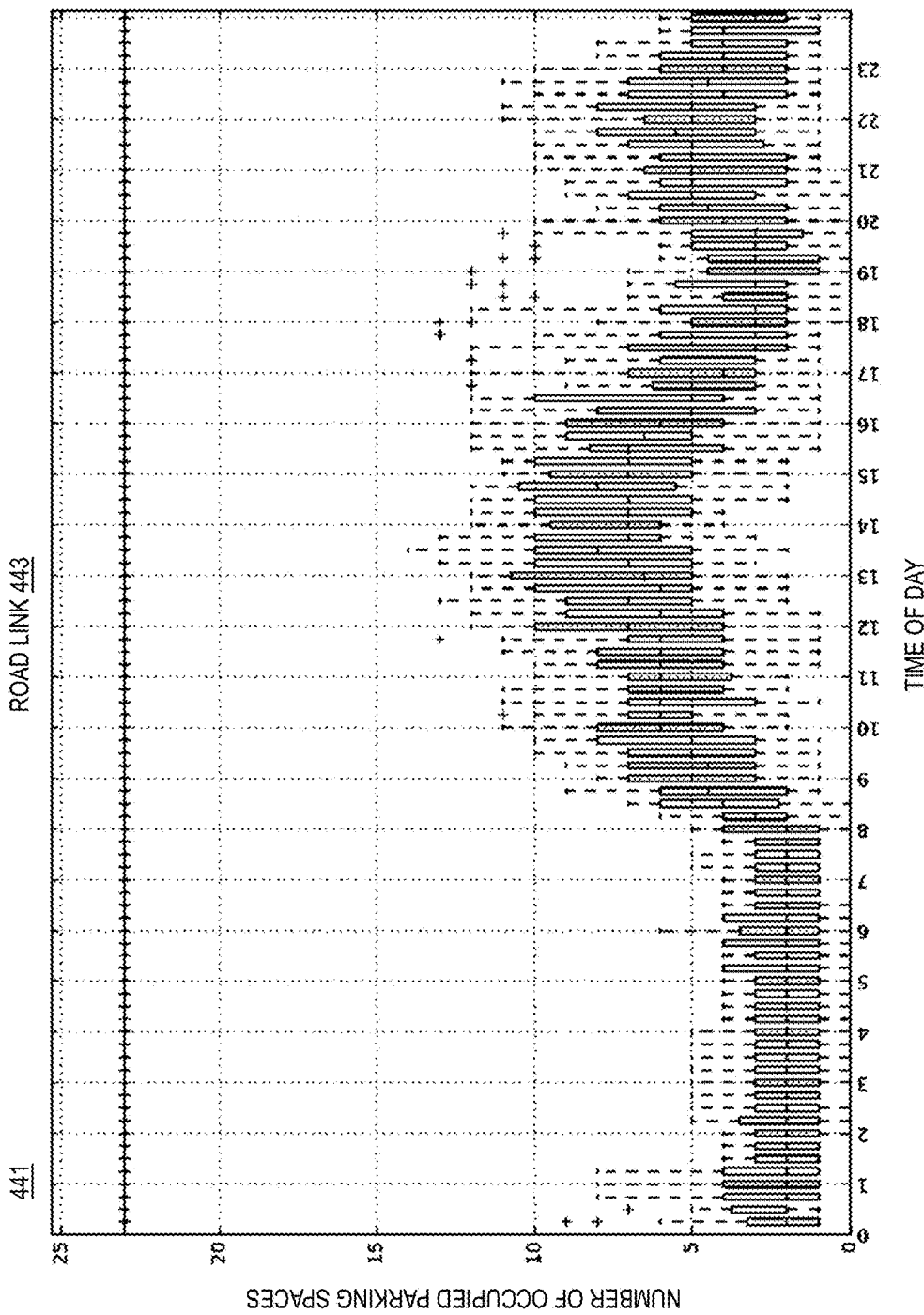
Figure 4D:
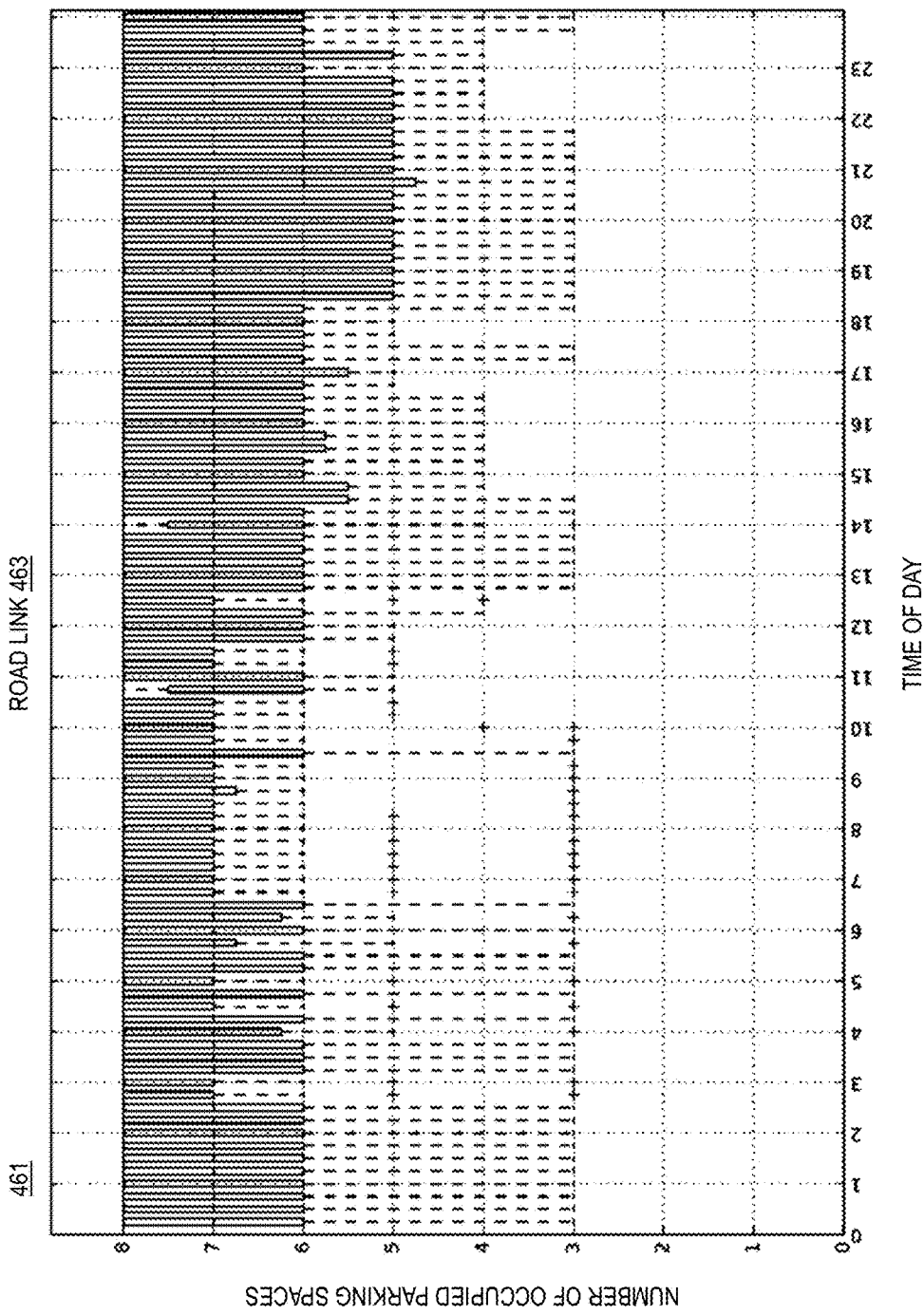

FIGS. 4C and 4D show other examples of other types of map regions 101. For example, the historical parking data 441 of FIG. 4C for a road link 443 is a low occupancy pattern where parking occupancy is generally low throughout the day with a slight increase in variability during the middle of the day. This historical parking data 441 can indicate that the road link 443 is not near residential or business areas that would drive traffic to the road link 443. In contrast, the parking occupancy pattern 461 of FIG. 4D shows a high occupancy road link 463 in which its parking spots are almost always fully occupied 24 hours a day by 7 days a week with relatively high variability. For example, the road link 443 can be located in a busy center that includes a large number of commercial and residential POIs (e.g., skyscrapers with a large number of business and residential units).

In the examples of FIGS. 4A-4D, the historical data module 201 has organized the parking data into time epochs of 1-hour each. However, it is contemplated that the time epoch can be of any duration and can vary between time epochs. In one embodiment, the time epoch can be the time difference between each collected data point so that each epoch includes only one map data record. In one embodiment, the historical data module 201 can specify the duration of a time epoch based on a desired level of granularity for calculating data variability or turbulence. For example, shorter time epochs enable detection of finer changes in data variability while longer time epochs can reduce the computational load for subsequent turbulence calculations.

It is noted that the examples of FIGS. 4A-4D are provided by way of illustration of parking data as example of one type of map data, and are not intended as limit the map data to just parking data. As previously discussed, it is contemplated that any number or varieties of map data can be collected and/or extracted for any map region 101 represented in the geographic database 103.

Returning to FIG. 3, in step 305, after the historical data module 201 retrieves and organizes the historical map data according to the embodiments described above, the data turbulence module 203 calculates a first representative value of the map data for the first time epoch based on the historical map data segmented into the first time epoch, and a second representative value for the map data for the second time epoch based on the historical map data segmented into the second time epoch. In one embodiment, the data turbulence module 203 can calculate or determine representative values for each time epoch of the retrieved historical map data. In this case, the first and second time epochs discussed above are part of a plurality of time epochs of the historical map data. In one embodiment, the map data parameter corresponding to the representative values being calculated can depend on the map data of interest. For example, with respect to parking data, the representative value can be a parking availability value for the given time epoch (e.g., how many spaces are available or occupied in the map region 101 at a sampled time). As another example, the representative value for traffic data as the map data of interest can be traffic speed, number of vehicles, traffic delay, number of accidents, etc.

In step 307, the data turbulence module 203 calculates the map data turbulence based on the first representative value and the second representative value. The data turbulence, for instance, can be determined from the variability between the representative values calculated for the time epochs of the historical map data. It is contemplated that any means or metric for calculating data variability between the representative values can be used according to the embodiments described herein. For example, in one embodiment, the data turbulence module 203 calculates a difference between the first representative value (e.g., parking availability metric representing parking available in the map region 101 of interest) and the second representative value (e.g., a second parking availability metric for the map region 101 of interest). The data turbulence specific to a given map region 101 is then based on the differences between the representative values calculated for that region. One example process for calculating parking availability turbulence includes, but is not limited to, the process indicated in the following equation:

$$\text{street parking availability turbulence} = \sum_{i=0}^{i=n-1} (|PA(t_i) - PA(t_{i+1})|)/n$$

Where $(PA(t_i)$ is the parking availability at time t, $PA(t_{i+1})$ is the parking availability at time t+1, and n is the number of time epochs of the historical map data that is evaluated. Although the equation above uses parking data as an example, the equation can be generalized to any type of map data as follows:

$$\text{data turbulence} = \sum_{i=0}^{i=n-1} (|RV(t_i) - RV(t_{i+1})|)/n$$

Where $(RV(t_i)$ is the representative value of a selected map data parameter at time t, $RV(t_{i+1})$ is the representative value at time t+1, and n is the number of time epochs of the historical map data that is evaluated.

As shown in the equations above, the data turbulence module 203 takes the absolute value of the difference since parking availability or other representative values can increase or decrease, and variability is based on the absolute difference according to various embodiments. As previously described, the data turbulence can be computed from historical map data for multiple map regions 101 (e.g., multiple links, tiles, traffic message channels (TMCs), etc.). In addition, in one embodiment, the parking data turbulence is calculated with respect to any contextual parameter including, but not limited to, a time of day, a day of week, a weekday versus a weekend, a week, a month, a season, a year, or a combination thereof. Accordingly, under this embodiment, the data turbulence module 203 can stratify the historical mapping data according to the contextual parameter and then calculate a separate respective data turbulence for each context of the contextual parameter (e.g., a contextual parameter can be a day of week, and a context under this parameter is each day of the week, Monday to Sunday).

Figure 5A:
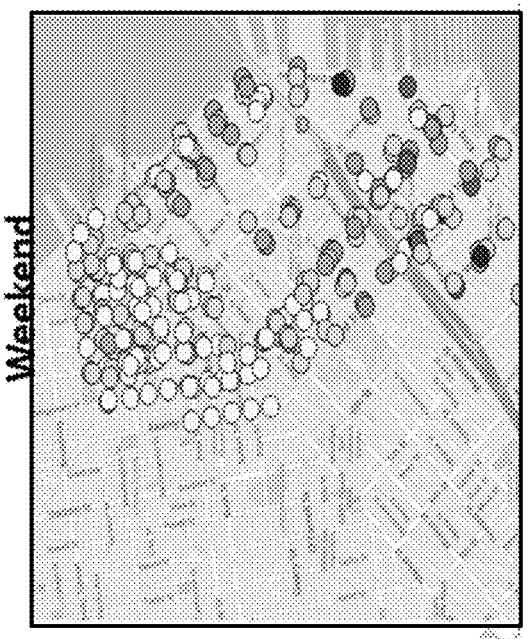
FIGS. 5A and 5B are diagrams illustrating example user interfaces for displaying data turbulence for an example map region, according to one embodiment.
Figure 5B:
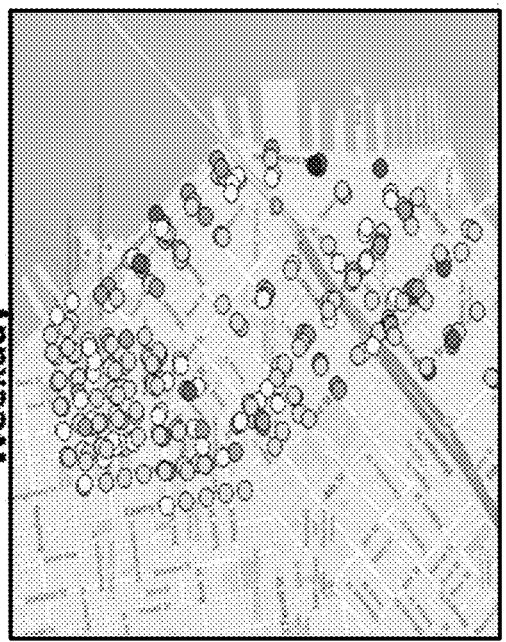

FIGS. 5A and 5B are diagrams illustrating example user interfaces for displaying data turbulence for an example map region under different contexts, according to one embodiment. In the example of FIGS. 5A and 5B, the data turbulence module 203 has calculated parking data turbulence based on historical parking data for a commercial business district with respect to weekdays versus weekends. In one embodiment, the user interface module 209 generates the user interfaces of FIGS. 5A and 5B for display to an end user via a user device such as the UE 111 and/or the vehicle 109 (e.g., a navigation system of the vehicle 109). For example, the user interface module 209 presents that mapping user interfaces of FIGS. 5A and 5B to depict a graphical representation of the parking data turbulence overlaid onto a visual representation of the map region.

The depicted commercial district includes multiple road links each representing a separate map region 101 for the purposes of calculating data turbulence. Data turbulence values can then be calculated for each of the road links under each of the contexts (e.g., weekdays as shown in mapping user interface 501 of FIG. 5A, and weekends as shown in mapping user interface 521 of FIG. 5B). The locations of the points or circles depicted in FIGS. 5A and 5B represent one end of respective links or map regions 101 of interest. The shading of the points or circles depicts the parking availability turbulence calculated for the link. In this example, a darker shade indicates that the turbulence is higher, and a lighter shade indicates that the turbulence is lower. FIG. 5A depicts data turbulence under a weekday context for the depicted commercial business district, and FIG. 5B depicts data turbulence under a weekend context for the depicted commercial business district. As shown, it is observed that on weekdays the district's parking availability is generally more volatile than on weekends since there are more darker points in FIG. 5A than in FIG. 5B.

Thus, in one embodiment, the update frequency module 205 can optionally compute different map data update frequencies under each link and/or context based on their respective data turbulences (step 309 of FIG. 3). It is contemplated that the update frequency module 205 can use any process to calculate a map update frequency from the data turbulence provided that the process results in a data update frequency that monotonically increases with increasing data turbulence. When expressing update frequency as a period between updates, the update period monotonically decreases with increasing data turbulence. The following equation provides an example of an exponential function that can be used to determine data update frequency from data turbulence (in this example, frequency is expressed as a period between data updates):

$$\text{data update period} = (1-(1-a*(\exp(-\text{data turbulence})))^b$$

Where a and b are configurable parameters to tune the rate at which the update frequency increases with data turbulence, and data turbulence is normalized to a value between 0 and 1.

This general equation can be tuned to calculated parking data turbulence using, for instance, a value of 0.79 for a and 10.5 for b so that parking update frequency can be calculated as:

$$\text{parking data update period} = (1-(1-0.79*(\exp(-\text{data turbulence})))^{10.5}$$

Figure 6:
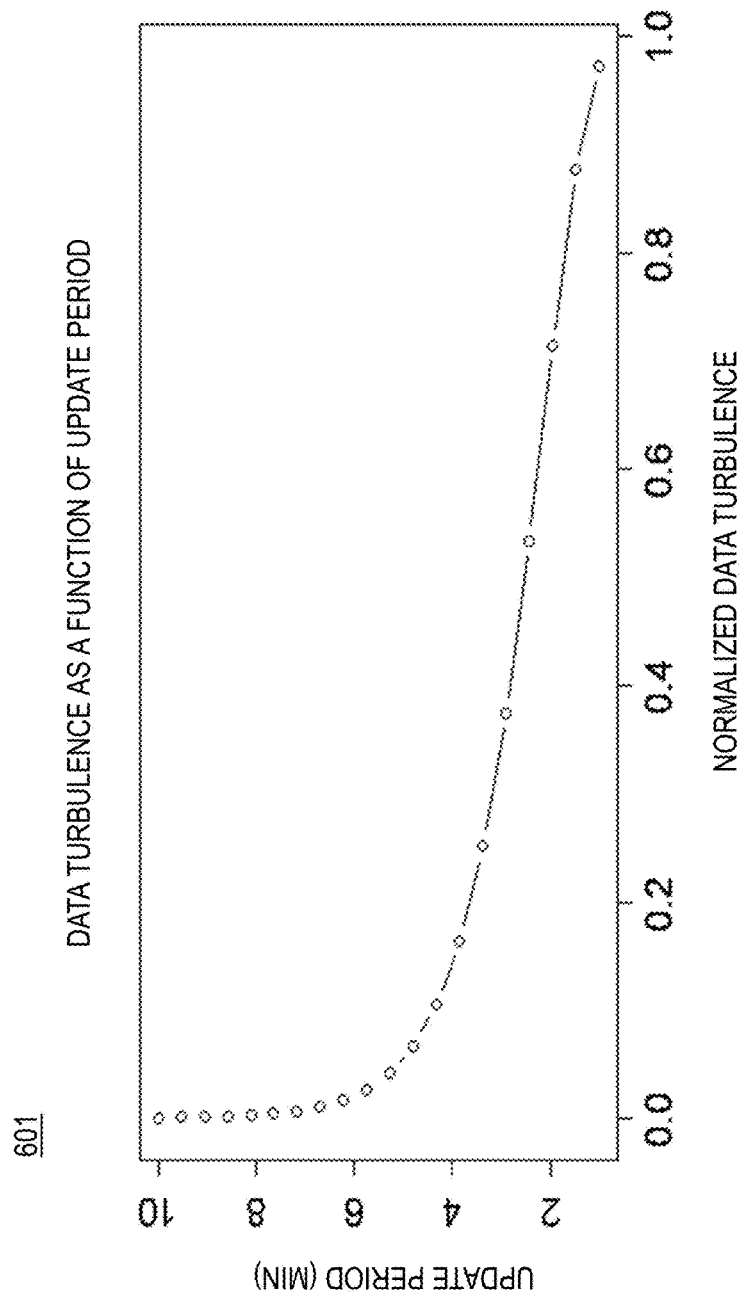
FIG. 6 is a plot of a function relating update period to data turbulence, according to one embodiment.

FIG. 6 is a plot of a function relating update period to data turbulence, according to one embodiment. The plot 601 of FIG. 6 represents the equation above for calculating parking data update periods based on parking data turbulence. More specifically, the plot 601 shows how the data turbulence index varies with the time period for updating parking information for a given road link or map region 101. As shown in plot 601, when the parking turbulence index is high, the update period low (e.g., update frequency is high) and new parking information needs to be recomputed and/or published more quickly. On the other hand, when the street parking turbulence is found to be low, then data update module 207 can delay recomputing and/or publishing parking information. For example, from the plot 601, if the turbulence index is 1, the data update module 207 can compute and/or publish new parking information every minute. However, if the turbulence index is 0.2 then the data update module 207 can compute and/or publish new parking information every 4 minutes, thereby advantageously saving processing power and channel bandwidth. With respect to map data in general, the data update module 207 can initiate a computation or a transmission of a map data update based on the data update frequency or period calculated from the respective data turbulence.

In one embodiment, the data update module 207 can couple the computation and transmission/publication of the update into a common task that is performed at each update period or update instance indicated by the calculated data update frequency. In other words, whenever update period or update instance occurs, the data update module 207 will compute and then transmit the resulting update in one combined action.

In other embodiments, the data update module 207 can decouple the computation and transmission of an update. For example, at an update period or update instance of the parking data update frequency, the data update module 207 initiates a computation of a parking data update. The data update module 207 then determines whether the computation satisfies a transmission criterion and will only initiate a transmission of the parking data update based on a determination if the computed parking data satisfies a transmission criterion. For example, the transmission criterion may specify that the updated data (e.g., updated parking availability data) should be more than a threshold value different from the previous data before transmitting the update. In this way, the data update module 207 can further advantageously reduce bandwidth usage by transmitting updates only when needed. It is contemplated that the transmission criterion discussed above is only one example of a transmission criterion, and that any other transmission criterion can be used on implemented by the data update module 207.

Figure 7:
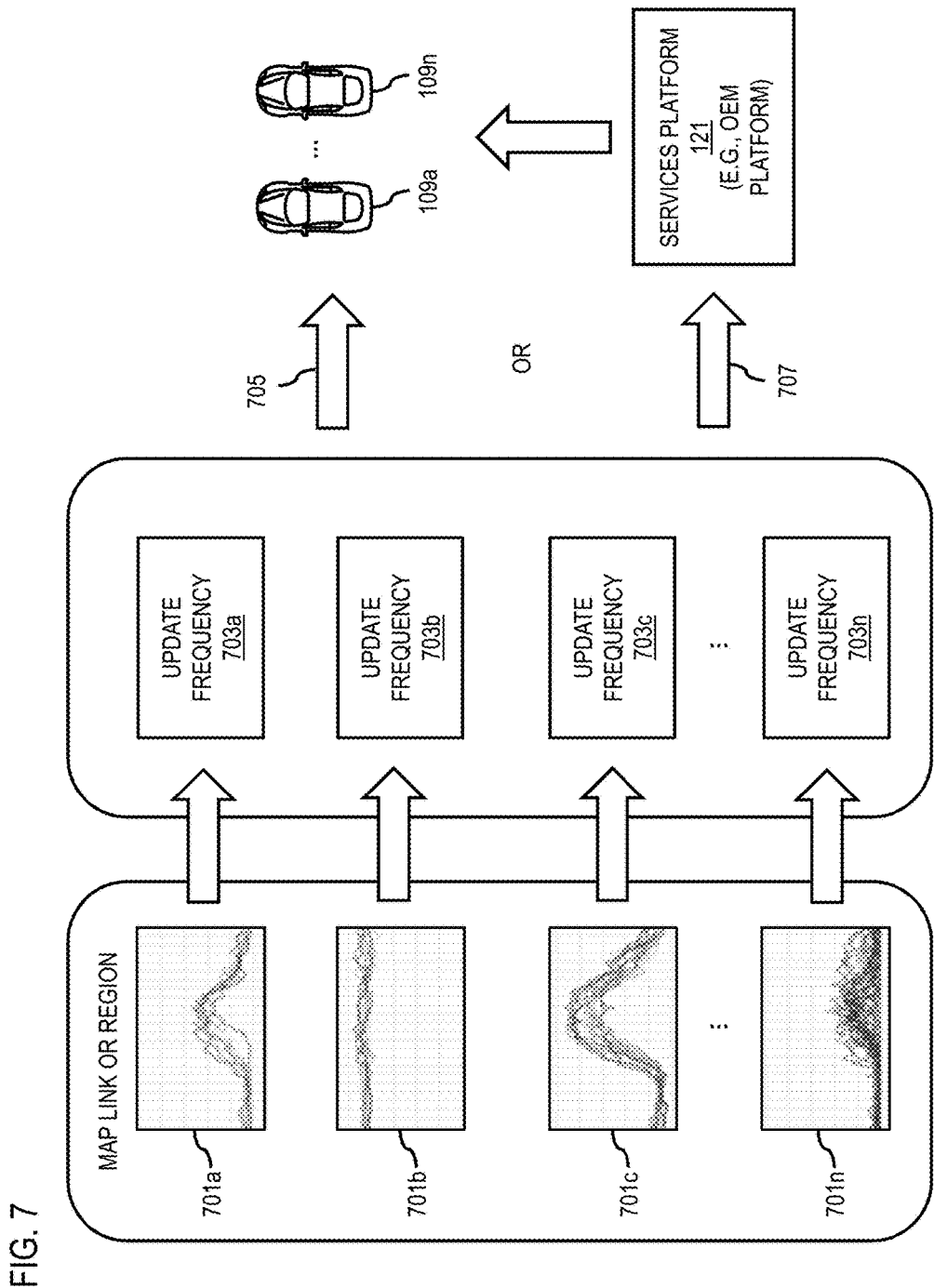
FIG. 7 is a diagram of a process for computing and/or transmitting data updates based on update frequencies determined from data turbulence, according to one embodiment.

FIG. 7 is a diagram of a process for computing and/or transmitting data updates based on update frequencies determined from data turbulence, according to one embodiment. It is contemplated that the data update module 207 can use any architecture for transmitting mad data and related updates to the end user devices (e.g., the vehicle 109, UE 111, etc.). FIG. 7 illustrates two examples of such an architecture. In the example of FIG. 7, the mapping platform 113 processes historical map data for a set of map regions 701a-701n to calculate respective update frequencies 703a-703n (also collectively referred to as map update frequencies 703) for transmitting updates to the vehicles 109. Alternatively (e.g., when the map update frequencies 703 have previously been determined and/or stored in, for instance, the geographic database 103), the mapping platform 113 can determine the map update frequency 703 by querying the geographic database 103 or other equivalent data store. As previously discussed, the map update frequencies 703 are based on the respective data turbulences calculated from historical map data for the map regions stored in the geographic database. In one embodiment, the data turbulences are values indicating variability of the historical map data in the respective regions over a period of time. The data update module 207 can then either the transmission path or architecture 705 or the transmission path or architecture 707 to provide the data updates to the vehicles 109 according to the data turbulence-based update frequencies generated according to the various embodiments described herein.

For example, under architecture 705, the transmission is performed over a communication network (e.g., a communication network 119 of FIG. 1) between the mapping platform 113 and one or more user devices (e.g., the vehicles 109, UE 111, etc.) directly. In another embodiment, the transmission is performed over the communication network 119 between the mapping platform 113 and a third party provider such as a OEM platform or other third party service. By way of example, the OEM platform or other third party platform can include the services platform 121 of FIG. 1. On receiving, the update from the mapping platform 113, the third party provider (e.g., the services platform 121 and/or any of the services 123a-123j, also collectively referred to as services 123) further transmits the map data update to one or more user devices (e.g., the vehicles 109, UE 111, etc.).

Returning to FIG. 1, the mapping platform 113 has connectivity to map data collection infrastructure comprising, for instance, map data sensors 105, probe vehicles 109, and probe UEs 111. As previously discussed, with respect to parking data, the infrastructure can be a parking data infrastructure comprising the parking sensors 105 capable of detecting when a vehicle 109 parks in or leaves a parking space 107 (e.g., embedded magnetic sensors, imaging sensors, etc.), and then storing or transmitting the collected sensor data as parking data. In addition or alternatively, each vehicle 109 can be equipped with sensors (e.g., location sensors) that can also detect when the vehicle 109 parks in or leaves a parking space 107, for storage or transmission as parking occupancy data.

In one embodiment, the vehicles 109 and/or the UE 111 associated with a vehicle 109 can act as probes traveling over a road network represented in the geographic database 103. For example, the UE 111 can be a standalone device (e.g., mobile phone, portable navigation device, wearable device, etc.) or installed/embedded in the vehicle 109. In one embodiment, the vehicle 109 and/or UE 111 may be configured with one or more sensors 125 for determining map data (e.g., parking data, traffic data, weather data, etc.). By way of example, the sensors 125 may include location sensors (e.g., GPS), accelerometers, compass sensors, gyroscopes, altimeters, etc. In one embodiment, the sensors 125 can also be used to detect and report status data about an operational state of the vehicle 109 to assist in determining when the vehicle 109 parks in or leaves a parking space 107. For example, a parking event may be detected when it is determined that a vehicle's is engine off, the key is outside of the car, the vehicle door is locked, and/or the like. In one embodiment, the vehicle 109 and/or UE 111 are assigned unique probe identifiers (probe ID) for use in reporting or transmitting collected probe data for determining parking occupancy data. The vehicle 109 and UE 111, for instance, are part of a probe-based system for collecting probe data for building parking occupancy models according to the various embodiments described herein.

In one embodiment, when a vehicle 109 and/or UE 111 (e.g., via a navigation system, navigation application 115, and/or the like) requests instructions to find parking or retrieve other map data in a given area or location, the mapping platform 113 can use the data turbulence calculated according to the various embodiments described herein to determine how often to provide updates to requested parking or other map data for the requested map regions 101. The mapping platform 113 can then provide the map data to the vehicle 109 and/or the UE 111 for presentation in a mapping or navigation user interface. For example, the retrieved map data (e.g., parking data) can be used to route a user (e.g., routing to a nearest parking area to the user's destination with parking availability), to provide a better estimated time of arrival (ETA) at a given destination depending on parking availability, etc.

In one embodiment, as noted above, the vehicles 109 are equipped with an embedded navigation systems or other navigation devices (e.g., a UE 111) that are capable of submitting requests for parking information (e.g., parking availability, etc.) or other map data, and of guiding a driver of the vehicle 109 along a navigation route using the map data provided based on the data turbulence calculated according to the various embodiments described herein. In one embodiment, as the driver navigates along the received route, the vehicles 109 and/or UE 111 (e.g., via a navigation application 115) may receive real-time updates on the requested map data (e.g., parking occupancy data) for road links or street segments near a destination of the navigation route (e.g., links or street segments within a threshold distance of the destination) at update frequencies determined from the data turbulence calculated according to the various embodiments described herein.

In one embodiment, the vehicle 109 and/or UE 111 are configured to report probe data as probe points, which are individual data records that record telemetry data collected at a point in time. In one embodiment, a probe point can include attributes such as a heading, a speed, a time, or a combination thereof of each of the plurality of devices. It is contemplated that any combination of these attributes or other attributes may be recorded as a probe point. As previously discussed, the vehicle 109 may include sensors for reporting measurements and/or reporting attributes. The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior.

In one embodiment, the mapping platform 113, the vehicles 109, and/or the UE 111 can interact with the services platform 121 (e.g., an OEM platform), one or more services 123, one or more content providers 117, or a combination thereof over the communication network 119 to provide functions and/or services based on the data turbulence and/or data update frequencies generated according to the various embodiments described herein. The services platform 121, services 123, and/or content providers 117 may provide mapping, navigation, and/or other location based services to the vehicle 109 and/or UE 111.

By way of example, the UE 111 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

By way of example, the mapping platform 113 may be implemented as a cloud based service, hosted solution or the like for performing the above described functions. Alternatively, the mapping platform 113 may be directly integrated for processing data generated and/or provided by the services platform 121, services 123, content providers 117, and/or applications 115. Per this integration, the mapping platform 113 may perform client-side parking occupancy model building based on historical parking occupancy data.

By way of example, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the mapping platform 113 communicates with other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
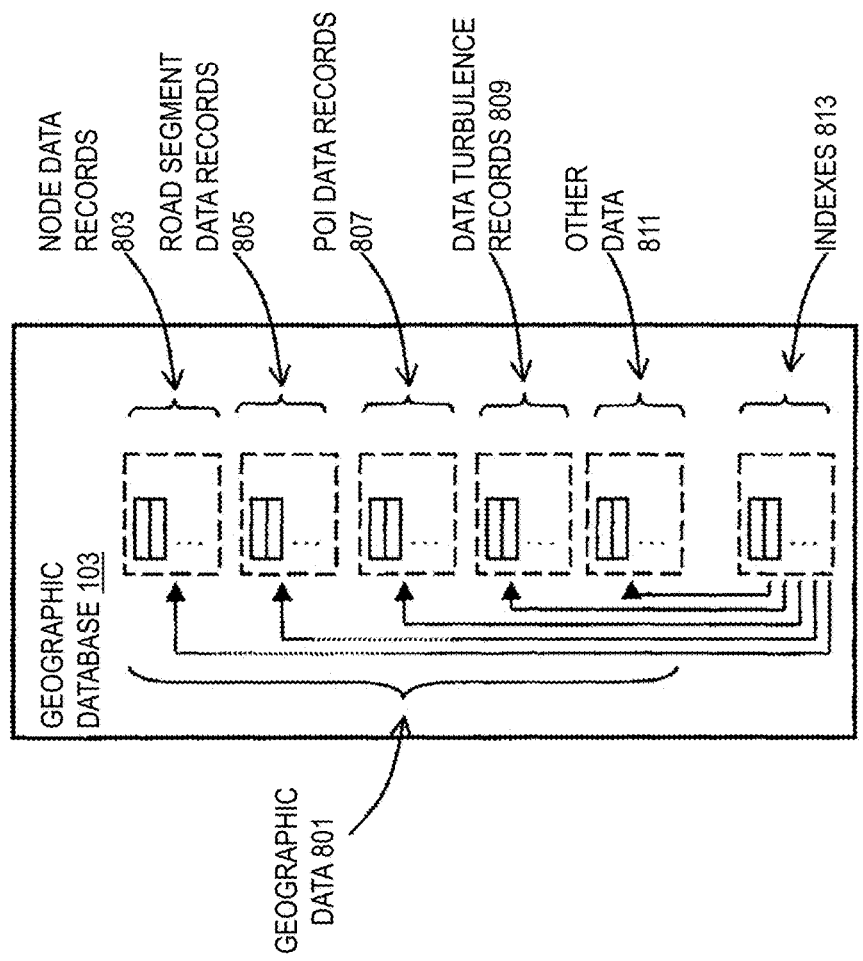
FIG. 8 is a diagram of a geographic database, according to one embodiment.

FIG. 8 is a diagram of the geographic database 103, according to one embodiment. In one embodiment, historical map data (e.g., parking data, traffic data, weather data, map feature data, etc.), the data turbulence and data update frequencies generated according to the various embodiments described herein, and/or any other information used or generated by the system 100 with respect to providing a mad data updates based on a region-specific data turbulence can be stored, associated with, and/or linked to the geographic database 103 or data thereof. In one embodiment, the geographic or map database 103 includes geographic data 801 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 103 includes node data records 803, road segment or link data records 805, POI data records 807, data turbulence records 809, other data records 811, and indexes 813, for example. More, fewer or different data records can be provided.

In one embodiment, these records store map data and/or features used for determining data turbulence for a map region 101 under various contexts according to the embodiments described herein. For example, the features and/or contexts include, but are not limited to: (1) functional class of the link (e.g., principal arterial roadways, minor arterial roadways, collector roadways, local roadways, etc.); (2) POI density along a link (e.g., how many POIs are located along the link); (3) night life POI density along a link (e.g., how many POIs classified related to night life are along the link, such as restaurants, bars, clubs, etc.); (4) POI types along a link (e.g., what other types of POIs are located along the link); (5) population density along a link (e.g., the population of people living or working areas around the link); (6) road density along a link (e.g., how many roads are within a threshold distance of the link); (7) zoning (e.g., CBD, residential, etc.); (8) time epoch (e.g., segmentation by a defined period of time such as 15 mins, 1 hour, etc. periods of time); (9) weekday/weekend; (10) bi-directionality (e.g., whether traffic flows in two or multiple directions along the link); and (11) accessibility to public transit (e.g., proximity to subways, buses, transit stations, etc.).

In one embodiment, the other data records 811 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In one embodiment, the indexes 813 may improve the speed of data retrieval operations in the geographic database 103. In one embodiment, the indexes 813 may be used to quickly locate data without having to search every row in the geographic database 103 every time it is accessed.

In exemplary embodiments, the road segment data records 805 are links or segments representing roads, streets, or paths, as can be used in the calculated route or recorded route information. The node data records 803 are end points corresponding to the respective links or segments of the road segment data records 805. The road link data records 805 and the node data records 803 represent a road network, such as used by vehicles, cars, and/or other entities. Alternatively, the geographic database 103 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 103 can include data about the POIs and their respective locations in the POI data records 807. The geographic database 103 can also include data about places, such as cities, towns, or other communities, and other geographic features, such as bodies of water, mountain ranges, etc. Such place or feature data can be part of the POI data 807 or can be associated with POIs or POI data records 807 (such as a data point used for displaying or representing a position of a city).

In one embodiment, the data turbulence records 809 can include any data item used by the mapping platform 113 including, but not limited to historical map data. With respect to parking data, the data turbulence records 809 can also include parking occupancy data, link categories or clusters, parking occupancy patterns or templates associated with the clusters or link categories, parking availability information, parking duration model data, parking data, estimated waiting times to park for parking areas of interest, travel segments within the parking areas to monitor, number of spaces, parking search behaviors, probe or trajectory data, travel profile information, user preferences, and/or the like. The data turbulence records 809 can also include the suppression and/or update transmission criteria used for data turbulence and/or data update frequency calculations. In addition, the data turbulence records 809 can include the calculated turbulence and/or data update frequencies calculated for map regions 101 stored in the geographic database 103. As such, the data turbulence records 809 can be associated with any of the links, map tiles, geographic areas, POIs, political boundaries, etc. represented in the geographic database 103.

The geographic database 103 can be maintained by the content provider in association with the services platform 121 (e.g., a map developer). The map developer can collect geographic data 801 to generate and enhance the geographic database 103. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database 103 or data 801 in the master geographic database 103 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems (e.g., associated with the vehicles 109 and/or UE 111).

For example, geographic data 801 or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a vehicle 109 and/or UE 111 (e.g., via a navigation application 115), for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 103 can be a master geographic database, but in alternate embodiments, the geographic database 103 can represent a compiled navigation database that can be used in or with end user devices (e.g., the vehicles 109 and/or UEs 111) to provide navigation-related functions including estimations of parking availability and waiting times to park in various parking areas. For example, the geographic database 103 can be used with the end user device (e.g., vehicle 109 and/or UE 111) to provide an end user with navigation features. In such a case, the geographic database 103 and/or its related parking data/information can be downloaded or stored on the end user device, or the end user device can access the geographic database 103 through a wireless or wired connection (such as via a server and/or the communication network 119), for example.

The processes described herein for providing map data updates based on region-specific data turbulence may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
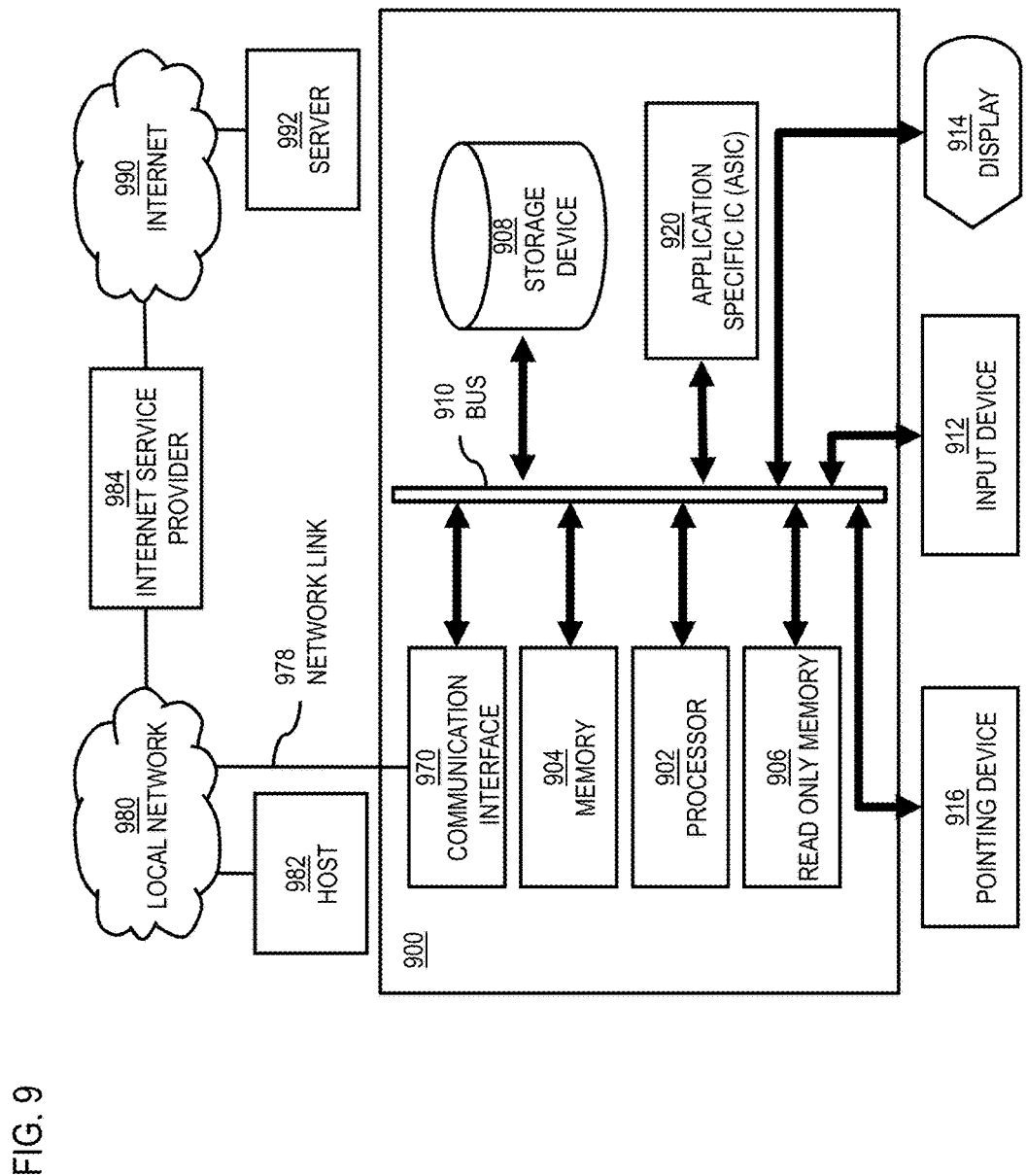
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide map data updates based on region-specific data turbulence as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing map data updates based on region-specific data turbulence. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing map data updates based on region-specific data turbulence. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing map data updates based on region-specific data turbulence, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 119 for providing map data updates based on region-specific data turbulence.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide map data updates based on region-specific data turbulence as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide map data updates based on region-specific data turbulence. The memory 1005 also stores the data associated with or generated by the execution of the inventive steps.

Figure 11:
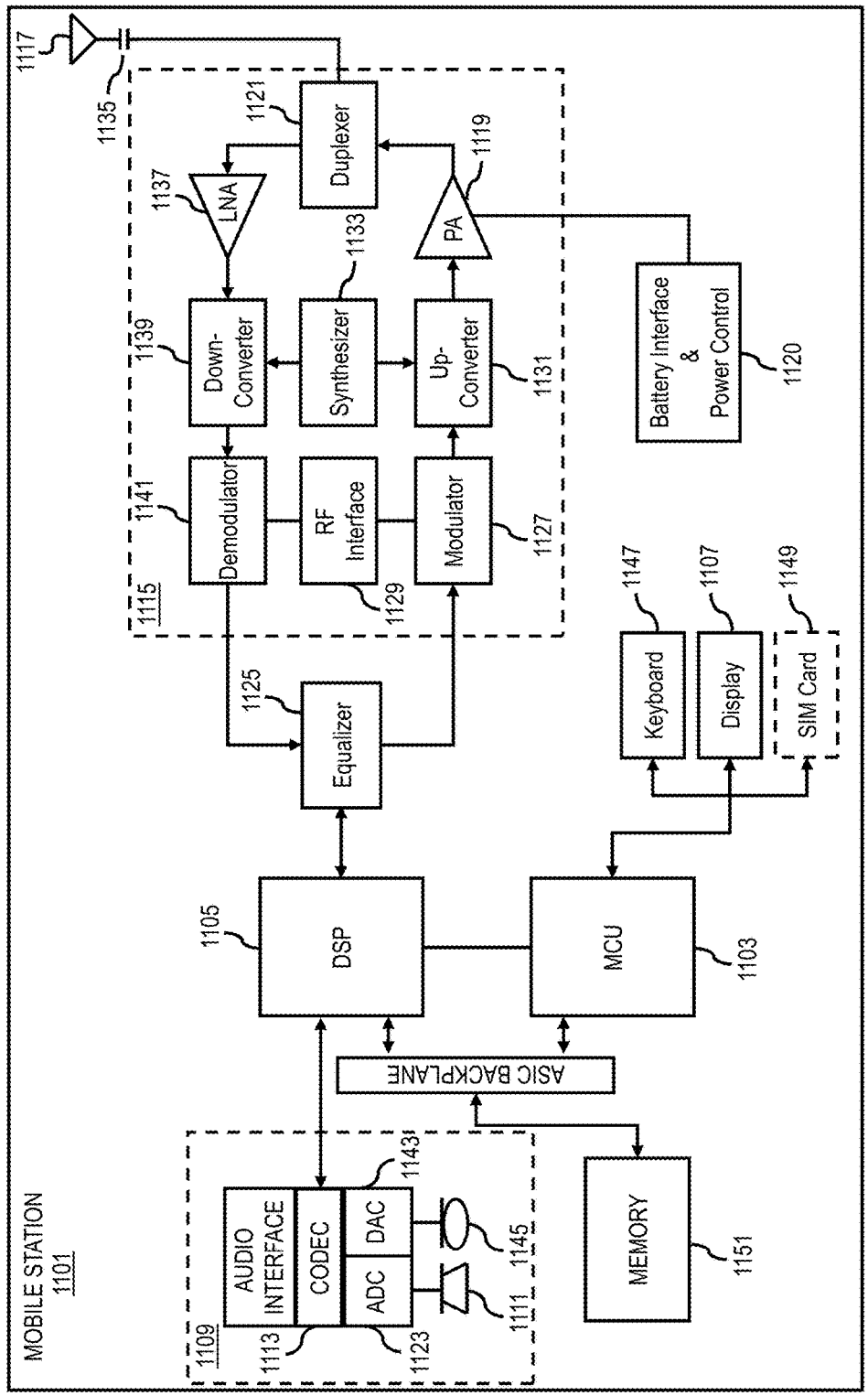
FIG. 11 is a diagram of a mobile terminal (e.g., mobile computer) that can be used to implement an embodiment.

FIG. 11 is a diagram of exemplary components of a mobile station 1101 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide map data updates based on region-specific data turbulence. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for measuring a parking data turbulence for a map region comprising:
   retrieving historical parking data for the map region;
   segmenting the historical parking data into a time series including at least a first time epoch and a second time epoch;
   calculating, by a processor, a first parking availability metric for the first time epoch based on the historical parking data segmented into the first time epoch, and a second parking availability metric for the second time epoch based on the historical parking data segmented into the second time epoch, wherein each of the availability metrics represents available parking in the map region for the corresponding time epochs; and
   calculating, by the processor, parking data turbulence based on the first parking availability metric and the second parking availability metric, wherein the parking data turbulence represents variability of the historical parking data over time.

2. The method of claim 1, further comprising:
   calculating a parking data update frequency based on the parking data turbulence, wherein the parking data update frequency specifies an interval between updates of the historical parking data; and
   initiating a computation or a transmission of a parking data update based on the parking data update frequency.

3. The method of claim 1, further comprising:
   calculating a parking data update frequency based on the parking data turbulence; and
   at an update instance of the parking data update frequency, initiating a computation of a parking data update; and
   initiating a transmission of the parking data update based on a determination that the computed parking data update satisfies a transmission criterion.

4. The method of claim 1, further comprising:
   suppressing one or more records of the historical parking data based on one or more suppression criteria,
   wherein the parking data turbulence, the first parking availability metric, the second parking availability metric, or a combination thereof is based on the historical parking data after the suppressing.

5. The method of claim 4, wherein the one or more suppression criteria includes a threshold number of operational parking sensors in the map region, and wherein the one or more records of the historical parking data are suppressed based on a determination that the observed number of operational parking sensors at the time the one or more records were collected is below the threshold number of operational parking sensors.

6. The method of claim 4, wherein the one or more suppression criteria includes a restricted parking time period for the map regions, and wherein the one or more records of the historical parking data are suppressed based on a determination that the one or more records were collected during the restricted parking time period or within a time threshold of a beginning or an ending of the restricted parking time period.

7. The method of claim 1, further comprising:
calculating a difference between the first parking availability metric and the second parking availability metric,
wherein the parking data turbulence is based on the difference.

8. The method of the claim 1, wherein the first time epoch and the second time epoch are consecutive time epochs in the time series.

9. The method of claim 1, further comprising:
presenting a mapping user interface depicting a graphical representation of the parking data turbulence overlaid onto a visual representation of the map region.

10. The method of claim 1, wherein the parking data turbulence is calculated with respect to a time of day, a day of week, a weekday versus a weekend, a week, a month, a season, a year, or a combination thereof.

11. An apparatus for measuring a map data turbulence for a map region comprising:
at least one processor; and
at least one memory including computer program code for one or more programs, the at least one memory and the computer program code configured to, with the at least one processor, cause the apparatus to perform at least the following,
retrieve historical map data for the map region;
calculate, by a processor, a first representative value for the historical map data associated with a first time epoch, and a second representative value for the historical map data associated with a second time epoch; and
calculate, by the processor, the map data turbulence based on the first representative value and the second representative value, wherein the map data turbulence represents variability of the historical map data over time.

12. The apparatus of claim 11, wherein the historical map data includes data representing a variable characteristic of the map region.

13. The apparatus of claim 12, wherein the variable characteristic includes a parking availability, a traffic condition, a map feature present in the map region, or a combination thereof.

14. The apparatus of claim 11, wherein the map region is represented as a map link, a map tile, a map data record, or a combination thereof of a geographic database.

15. The apparatus of claim 11, wherein the apparatus is further caused to:

calculate a map data update frequency based on the map data turbulence; and
initiate a computation or a transmission of a map data update based on the map data update frequency.

16. A non-transitory computer-readable storage medium for transmitting a parking data update based on a parking data turbulence for a map region, carrying one or more sequences of one or more instructions which, when executed by one or more processors, cause an apparatus to at least perform the following steps:
retrieving historical parking data for the map region;
segmenting the historical parking data into a time series including at least a first time epoch and a second time epoch;
calculating, by the processor, parking data turbulence based on the historical parking data of the first time epoch and the historical parking data of the second time epoch, wherein the parking data turbulence represents variability of the historical parking data over time;
calculating a parking data update frequency based on the parking data turbulence, wherein the parking data update frequency specifies an interval between updates of the historical parking data; and
initiating a transmission of a parking data update based on the parking data update frequency.

17. The non-transitory computer-readable storage medium of claim 16, wherein the transmission is performed over a communication network between a mapping platform and one or more user devices.

18. The non-transitory computer-readable storage medium of claim 17, wherein the transmission is performed over a communication network between a mapping platform and a third party provider, and wherein the third party provider further transmits the parking data update to one or more user devices.

19. The non-transitory computer-readable storage medium of claim 16, wherein the apparatus is further caused to perform:
at an update instance of the parking data update frequency, initiating a computation of a parking data update,
wherein the transmission of the parking data update is initiated based on a determination that the computed parking data update satisfies a transmission criterion.

20. A method for publishing a map data update comprising:
determining, by a processor, a map data update frequency for a map region, wherein the map data update frequency is based on a data turbulence of map data associated with the map region, wherein the map data update frequency specifies an interval between updates of the map data, and the data turbulence represents variability of the map data over time; and
initiating a transmission of the map data update based on the map data frequency.

21. The method of claim 20, wherein the data turbulence relates to availability of parking spots within the map region.

22. The method of claim 20, wherein the map region is among a plurality of map regions of a geographic database, wherein the map update frequency is specific to the map region, and wherein a respective other map update frequency is determined for each of one or more of the plurality of map regions.

* * * * *